US009294737B2

United States Patent
Hatcher, Jr. et al.

(10) Patent No.: US 9,294,737 B2
(45) Date of Patent: Mar. 22, 2016

(54) FLEXIBLE LINKAGE CAMERA SYSTEM AND METHOD FOR VISUAL INSPECTION OF OFF LINE INDUSTRIAL GAS TURBINES AND OTHER POWER GENERATION MACHINERY

(71) Applicant: Siemens Energy, Inc., Orlando, FL (US)

(72) Inventors: Clifford Hatcher, Jr., Orlando, FL (US); Richard Hatley, Morristown, NJ (US)

(73) Assignee: Siemens Energy, Inc., Orlando, FL (US)

( * ) Notice: Subject to any disclaimer, the term of this patent is extended or adjusted under 35 U.S.C. 154(b) by 338 days.

(21) Appl. No.: 13/972,322

(22) Filed: Aug. 21, 2013

(65) Prior Publication Data

US 2014/0055596 A1    Feb. 27, 2014

Related U.S. Application Data

(60) Provisional application No. 61/692,409, filed on Aug. 23, 2012.

(51) Int. Cl.
| | |
|---|---|
| *H04N 7/18* | (2006.01) |
| *G02B 23/24* | (2006.01) |
| *B25J 9/06* | (2006.01) |

(52) U.S. Cl.
CPC .............. *H04N 7/185* (2013.01); *B25J 9/065* (2013.01); *G02B 23/2492* (2013.01)

(58) Field of Classification Search
CPC ...... H04N 7/185; G02B 23/2492; B25J 9/065
USPC .......................................................... 348/82
See application file for complete search history.

(56) References Cited

U.S. PATENT DOCUMENTS

| | | | |
|---|---|---|---|
| 6,387,002 B1 | 5/2002 | Gunter | |
| 8,378,691 B2 | 2/2013 | Moser et al. | |
| 2003/0142207 A1* | 7/2003 | Olsson ................... | H04N 7/185 348/84 |
| 2007/0132842 A1* | 6/2007 | Morris ................... | H04N 7/185 348/82 |
| 2008/0287741 A1 | 11/2008 | Ostrovsky et al. | |
| 2009/0225159 A1* | 9/2009 | Schneider .......... | A61B 1/00124 348/82 |
| 2011/0306831 A1 | 12/2011 | Kohnke et al. | |

FOREIGN PATENT DOCUMENTS

| | | |
|---|---|---|
| DE | 3504824 A1 | 8/1986 |
| WO | 96/17695 | 6/1996 |
| WO | 2011042744 A2 | 4/2011 |

* cited by examiner

*Primary Examiner* — Allen Wong (57) ABSTRACT

Internal components of power generation machinery, including for example gas or steam industrial turbines as well as generators, are inspected a camera inspection system that is inserted and positioned within the machinery by an elongated cable carrier that has restricted cable flexure along a two-dimensional carrier cable flexure motion plane. A camera head that retains the camera is coupled to a distal end of the cable carrier. Embodiments also include a connector block coupled between the cable carrier distal end and the camera head. The connector block has a pivot axis coupled to the camera head for swinging the camera head along a camera head range of motion path that intersects the cable carrier flexure motion plane. Embodiments include a camera head swing motion drive system for selectively positioning the camera head along the camera head range of motion path.

20 Claims, 6 Drawing Sheets

FLEXIBLE LINKAGE CAMERA SYSTEM AND METHOD FOR VISUAL INSPECTION OF OFF LINE INDUSTRIAL GAS TURBINES AND OTHER POWER GENERATION MACHINERY

REFERENCE TO CO-PENDING APPLICATIONS

This application claims the benefit of co-pending United States patent application entitled "System And Method For Visual Inspection And 3D White Light Scanning Of Off-Line Industrial Gas Turbines And Other Power Generation Machinery", filed on the same date herewith and assigned Ser. No. 13/972,000, Siemens Docket Number 2013P09381US (Siemens 185) that in turn claims the benefit of copending United States provisional patent application entitled "Vision Scope 3D Scanner Tip for Visual Inspection and Measurement" filed Aug. 23, 2012 and assigned Ser. No. 61/692,409. All of said cited co-pending cited applications are incorporated by reference herein.

BACKGROUND OF THE DISCLOSURE

1. Field of the Invention

The invention relates to optical camera systems for nondestructive internal inspection of power generation machinery, including by way of non-limiting example industrial gas and steam turbines as well as generators. More particularly aspects of the invention relate to a visible light or infra-red optical camera inspection system that is capable of positioning the camera field of view (FOV) through a gas turbine inspection port, inlet or outlet in any portion of the engine, including the compressor section, combustor nozzle and transition and turbine section, capturing visual images of the engine's internal structure. The camera and its field of view are translated to areas of interest within the turbine or other power generation machinery by a flexible cable carrier that is structurally restricted to bi-directional planar flexure motion relative to centerlines defined by pivotally coupled adjoining chain links that form the cable carrier.

2. Description of the Prior Art

Power generation machinery, such as steam or gas industrial turbines, are often operated continuously with scheduled inspection and maintenance periods, at which time the turbine is taken off line and shut down. By way of example, a gas turbine engine often will be operated to generate power continuously for approximately 4000 hours, thereupon it is taken off line for routine maintenance, inspection, and repair of any components identified during inspection. Taking a gas turbine off line and eventually shutting it down completely for scheduled maintenance is a multi-day project. Some turbine components, such as the turbine rotor section, are operated at temperatures exceeding 1000° C. (1832° F.). The turbine requires 48-72 hours of cooling time to achieve ambient temperature before complete shutdown in order to reduce likelihood of component warping or other deformation. During the shutdown phase the turbine rotor rotational speed is spooled down from operating speed of approximately 3600 RPM to a speed of approximately 120 RPM or less in "turning gear mode" where the rotor is externally driven by an auxiliary drive motor, in order to reduce likelihood of rotor warping. Other turbine components, such as the turbine housing, are also cooled slowly to ambient temperature.

Once the turbine is cooled to ambient temperature over the course of up to approximately 72 hours internal components of the now static turbine can be inspected with optical camera inspection systems. Known optical camera inspection systems employ rigid or flexible optical bore scopes that are inserted into inspection ports located about the turbine periphery. The bore scope is manually positioned so that its field of view encompasses an area of interest within the turbine, such as one or more vanes or blades, combustor baskets, etc. A camera optically coupled to the bore scope captures images of objects of interest within the field of view for remote visualization and archiving (if desired) by an inspector.

If a series of different images of different areas of interest within a given turbine inspection port are desired, the inspector must manually re-position the camera inspection system bore scope to achieve the desired relative alignment of internal area of interest and the field of view. Relative alignment can be achieved by physically moving the bore scope so that its viewing port is positioned proximal a static area of interest. Examples of such relative movement of bore scope and static turbine component are by inserting a bore scope in different orientations within a static combustor or radially in and out of space between a vane and blade row within the compressor or turbine sections. For rotating blade inspection, relative alignment can also be achieved by maintaining the bore scope viewing port in a static position and rotating the blade row blades successively into the camera static viewing field.

Non-rotating static vane inspection within compressor or turbine section rows require physical movement of the inspection scope camera system field of view to each individual vane. The narrow confines of passages surrounding stationary vanes often will not facilitate passage of traditional inspection scope systems. In order to complete inspection of the vanes, supporting structures, such as vane shrouds are removed to provide sufficient visual exposure and/or passage of inspection scope components within the restricted confines of vane rows.

Thus, complete turbine inspection requires multiple manual relative repositioning sequences between the camera inspection system viewing ports and other internal inspection access points to allow complete visual inspection of all areas of interest within the turbine. Inspection apparatus positioning is challenging due to the complex, often tortuous manipulation paths between components in a gas turbine. The inspection scope camera delivery system must be sufficiently flexible to insert through tight confined passages, yet not too flexible or limp to prevent controlled positioning within the passages.

A need exists in the art for optical camera inspection systems and methods that reduce total time necessary to perform a nondestructive internal inspection of power generation machinery, including by way of non-limiting example stationary vane rows in turbine and compressor sections of industrial gas turbines. Preferably such faster internal inspections are performed with minimal (preferably no) dismantling of the machinery to obtain inspection access of areas of interest, so that the inspected power generation machine can be brought back on line for resuming power generation more quickly during maintenance cycles.

Another need exists in the art for optical camera inspection systems and methods that are capable of positioning inspection apparatus within power generation machinery, including by way of non-limiting example steam or gas turbines and generators, consistently and repetitively within an individual machine's inspection cycle with minimized risk of damage to machine internal components, high image quality, and quicker inspection cycling time than is attained by the known manual inspection apparatus and methods.

SUMMARY OF THE INVENTION

Accordingly, potential objects of the invention, jointly or severally among others, are to create optical camera inspection systems and methods for capturing images of internal areas of interest within power generation machinery, (including by way of non-limiting example steam or gas turbines and generators) that are selectively insertable through machinery access points and deliverable through internal passages with minimal (preferably no) dismantling of the machinery, to obtain inspection access of areas of interest. With such inspection systems and methods the inspected power generation machine can be brought back on line for resuming power generation more quickly during maintenance cycle inspection, without spending time and effort to dismantle and reassemble the machinery.

Other potential objects of the invention, jointly or severally among others, are to create optical camera inspection systems and methods for capturing images of internal areas of interest within power generation machinery consistently and repetitively within an individual machine's inspection cycle with minimized risk of damage to machine internal components, high image quality, and quicker inspection cycling time than is attained by the known manual inspection apparatus and methods.

These and other objects, among others, are achieved by embodiments of the invention. The optical camera inspection systems and methods of the invention utilize cable carriers to insert, deliver and position inspection camera heads that house inspection cameras through power machinery internal passages with minimal (and often no) dismantling of the machinery, to obtain inspection access of areas of interest. The cable carriers have individual chain links that restrict flexure motion to bi-directional pivotal planar motion relative to each link's respective ink centerline. Other embodiments include a connector block coupled between the cable carrier distal end and the camera head. The connector block has a pivot axis coupled to the camera head for swinging the camera head along a camera head range of motion path that intersects the cable carrier flexure motion plane. In other embodiments a camera head swing motion drive system is coupled to the camera head, for selectively positioning the camera head along the camera head range of motion path. The drive system has opposed first and second biasing elements respectively coupled to the camera head laterally in opposed offset positions relative to the connector block pivot axis. When operating the drive system, biasing the first biasing element swings the camera head in a first direction and biasing the second biasing element swings the camera head in a second direction. With such inspection systems and methods the inspected power generation machine is brought back on line for resuming power generation more quickly during maintenance cycle inspection, without spending time and effort to dismantle and reassemble the machinery as required for known inspection systems. The camera inspection systems and methods of the invention embodiments are especially suitable for inspecting stationary vane rows within compressor and turbine sections of industrial gas turbines, as well as other hard-to-reach areas of interest within power machinery. These inspection system and inspection method embodiments facilitate capturing images of internal areas of interest within power generation machinery consistently and repetitively within an individual machine's inspection cycle with minimized risk of damage to machine internal components, high image quality, and quicker inspection cycling time than is attained by the known manual inspection apparatus and methods.

Embodiments of the invention feature a system for internal inspection of power generation machinery that include an elongated cable carrier, capable of being maneuvered into internal areas of interest within power generation machinery from access points outside the machinery. The cable carrier is formed from a series of chain links that are pivotally coupled to each other end-to-end along a series of parallel pivot axes, which parallel axes constrain carrier cable flexure along a commonly defined carrier cable flexure motion plane. Each respective link defines a pair of the of the series of commonly aligned pivot axes along a link centerline at opposite ends of the link. Adjoining coupled chain links are restricted to bi-directional pivotal motion relative to each link's respective link centerline along the carrier cable flexure motion plane. A camera head is coupled to a distal end of the cable carrier. A camera, having a field of view, which is capable of remote image capture, is coupled to the camera head.

Other embodiments of the invention feature a system for internal inspection of power generation machinery, including an elongated cable carrier, capable of being maneuvered into internal areas of interest within power generation machinery from access points outside the machinery. The cable carrier is formed from a series of chain links that are pivotally coupled to each other end-to-end along a series of parallel pivot axes, which parallel axes constrain carrier cable flexure along a commonly defined carrier cable flexure motion plane. Each respective link defines a pair of the of the series of commonly aligned pivot axes along a link centerline at opposite ends. Adjoining coupled chain links are restricted to bi-directional pivotal motion relative to each link's respective link centerline along the carrier cable flexure motion plane. The system includes a camera head. A connector block is coupled between the cable carrier distal end and the camera head. The connector block has a pivot axis coupled to a pivoting joint in the camera head, for swinging the camera head along a camera head range of motion path that intersects the cable carrier flexure motion plane. A camera, having a field of view, which is capable of remote image capture by a control system, is coupled to the camera head. A control system is coupled to the camera, for capturing a camera image of a power generation machine internal area of interest within the camera field of view.

Additional embodiments of the invention feature a method for internal inspection of power generation machinery, comprising the steps of providing an internal inspection system having an elongated cable carrier, that is capable of being maneuvered into internal areas of interest within power generation machinery from access points outside the machinery. The cable carrier is formed from a series of chain links that are pivotally coupled to each other end-to-end along a series of parallel pivot axes. The parallel axes constrain carrier cable flexure along a commonly defined carrier cable flexure motion plane. Each respective link defines a pair of the of the series of commonly aligned pivot axes along a link centerline at opposite ends. Adjoining coupled chain links are restricted to bi-directional pivotal motion relative to each link's respective link centerline along the carrier cable flexure motion plane. The provided internal inspection system further includes a camera head, coupled to a distal end of the cable carrier, and a camera, having a field of view, which is capable of remote image capture, that is coupled to the camera head. The inspection method is further performed by positioning the inspection system and camera field of view along a the navigation path within the machine to an internal area of interest therein with the cable carrier and capturing a camera image.

The objects, features and embodiments of the invention may be applied jointly or severally in any combination or sub-combination. Not every object or feature need be incorporated in every embodiment.

BRIEF DESCRIPTION OF THE DRAWINGS

The teachings of the invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of the present invention can be readily utilized for inspection of internal components of power generation machinery, such as generators, gas or steam turbines with a camera inspection system that is inserted and positioned within the machine, for example through a gas turbine compressor section to capture images of a row of stationary vanes. The camera, mounted on a camera head, is inserted and positioned within the machinery by an elongated cable carrier that has restricted cable flexure along a two-dimensional carrier cable flexure motion plane. The camera head that retains the camera is coupled to a distal end of the cable carrier. Embodiments also include a connector block coupled between the cable carrier distal end and the camera head. The connector block has a pivot axis coupled to the camera head for swinging the camera head along a camera head range of motion path that intersects the cable carrier flexure motion plane. Embodiments include a camera head swing motion drive system for selectively positioning the camera head along the camera head range of motion path.

Camera Inspection System Overview

Figure 1:
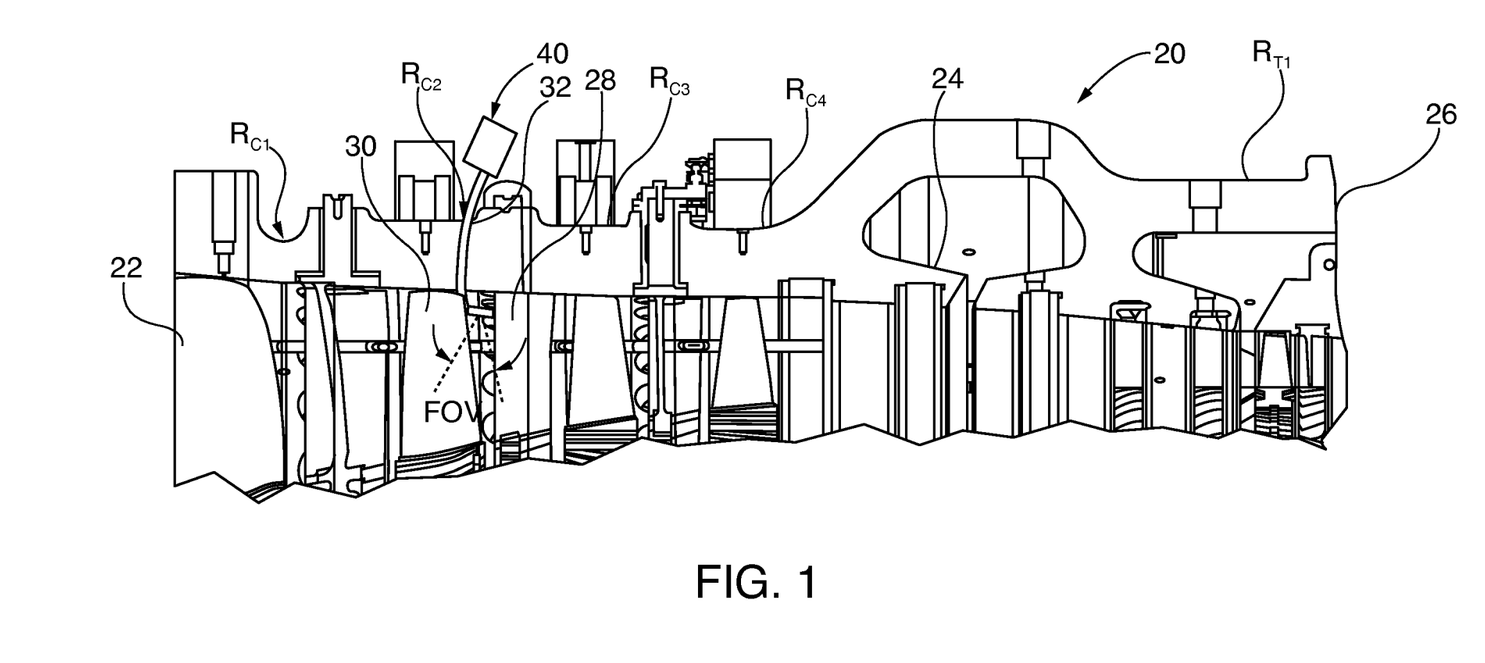
FIG. 1 is a partial cross sectional schematic view of a known industrial gas turbine, including its compressor, combustion and turbine sections.

Referring to FIG. 1, optical inspection system embodiments of the present invention facilitate off-line remote visual inspection of power generation machinery, such as industrial gas turbine 20 internal components, within the compressor 22, combustor 24 and turbine sections 26. Internal areas of interest for inspection within the gas turbine 20 typically include stationary compressor vanes 28 and compressor blades 30 in the compressor section rows $R_{C1}$-$R_{c4}$, internal structures in the turbine section rows $R_{T1}$-$R_{TN}$, and/or combustion section 24 combustors and transitions. Inspection port 32, shown in FIG. 1, provides an entry access inspection point for the internal inspection system 40, in order to inspect the row $R_{C2}$ stationary vanes 28. Embodiments of the present invention inspection system 40, which has at least one camera field of view (FOV) enable inspection of offline turbines 20 or other power generation machinery.

Rather than move the inspection scope 40 from one position to another, it is also possible to move the turbine component areas of interest within the camera field of view of a stationary inspection scope. For example, an inspection scope 40 that is inserted between blade and vane rows can capture an image of each blade 30 rotating within the camera field of view, whether the turbine is in turning gear mode or whether an operator manually "bumps" each blade of a completely stopped turbine rotor sequentially in front of the camera field of view.

Figure 2:
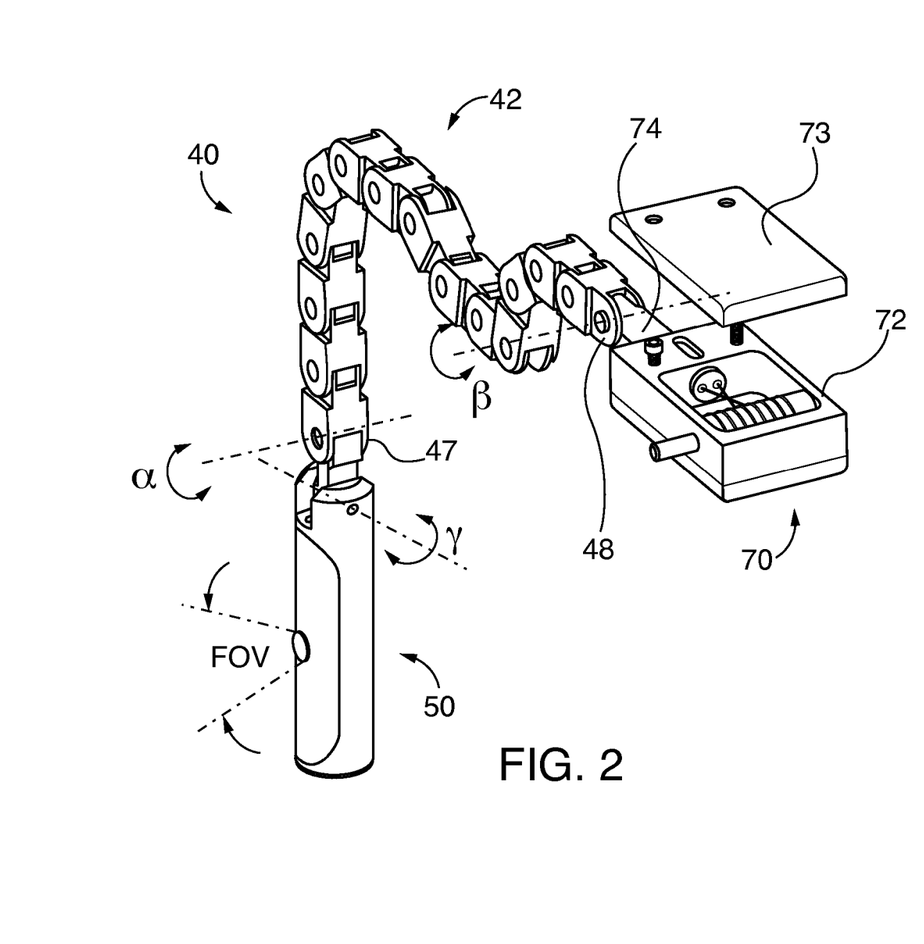
FIG. 2 is a perspective view of an embodiment of an optical camera inspection system of the invention showing bi-directional planar flexure of the cable carrier that delivers the camera to areas of interest within power generation machinery, including industrial gas turbines.
Figure 3:
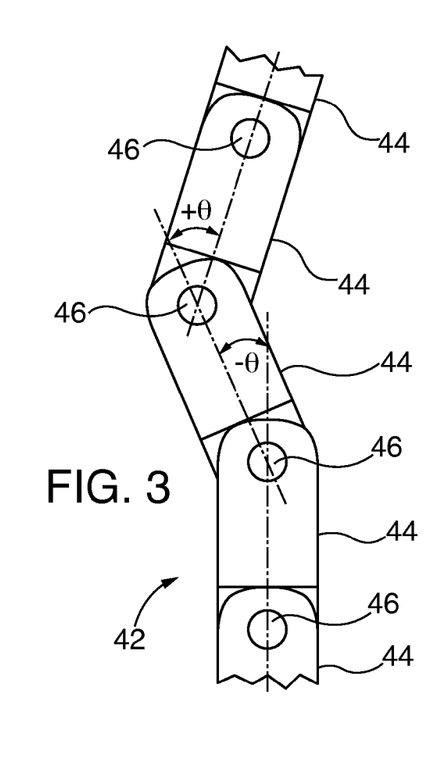
FIG. 3 is a detailed plan view of a plurality of end-to-end connected chain links of the cable carrier, showing bi-directional planar pivoting motion between pivot points of respective links, in accordance with an embodiment of the invention.
Figure 4:
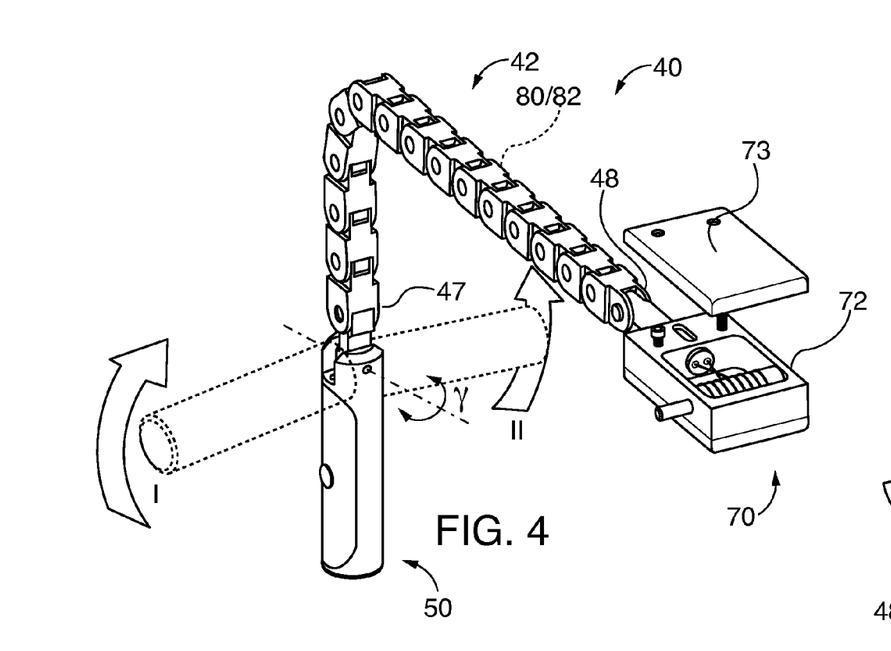
FIG. 4 is perspective view of the embodiment of the camera inspection system of FIG. 2, showing camera head tilting through a range of motion path that intersects the cable carrier flexure motion plane.

Referring generally to FIGS. 2-4, the inspection system inspection scope 40 includes an elongated hollow cable carrier 42 of known construction that receives flexible cables. Suitable cable carriers are sold by igus® Inc. of East Providence, R.I., USA, though products of other manufacturers may be substituted for those of the named manufacturer. The cable carrier 42 is formed from a series of chain links 44 that are pivotally coupled to each other end-to-end along a series of parallel chain pivot axes 46. Those parallel axes 46 constrain the carrier cable 42 flexure along a commonly defined carrier cable flexure motion plane. In FIG. 3 the cable flexure motion plane is parallel to the drawing sheet, so that links are free to pivot relative to each other as shown by the pivot angles $+\theta/-\theta$, but are restrained from relative motion in or out of the drawing sheet. Each respective chain link 44 defines a pair of the of the series of commonly aligned pivot axes 46 along a link centerline at opposite ends of the link, with adjoining coupled chain links restricted to bi-directional pivotal motion $+\theta/-\theta$ relative to each link's respective link centerline along the carrier cable flexure motion plane. The cable carrier 42 has a distal end 47 and a proximal end 48.

The inspection scope 40 has a camera head 50 that is pivotally coupled to the cable carrier distal end 47 through orthogonally aligned tilt angular range of motion a and swing angular range of motion γ, as shown in FIGS. 2 and 4. The swing angular range of motion γ, alone or in combination with the tilt angular range of motion α, intersects the cable carrier 42 flexure motion plane.

Figure 6:
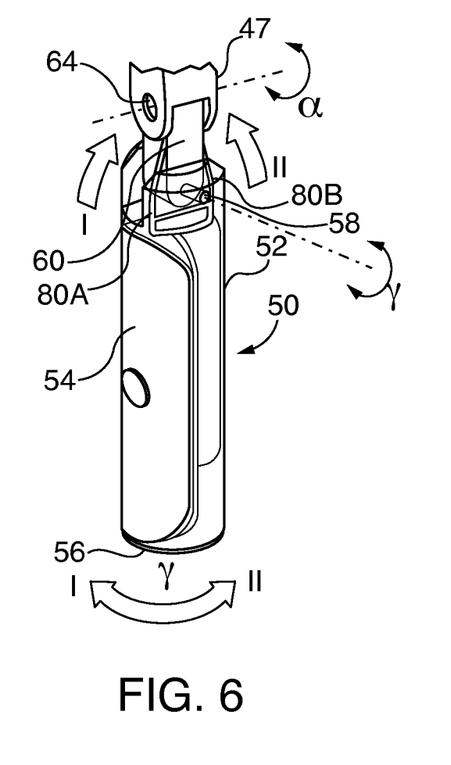
FIGS. 6 and 7 are perspective schematic views of the camera head of the optical camera inspection system of FIG. 2, showing the connector block and tensioning cables that facilitate camera head positioning, in accordance with an embodiment of the invention.
Figure 7:
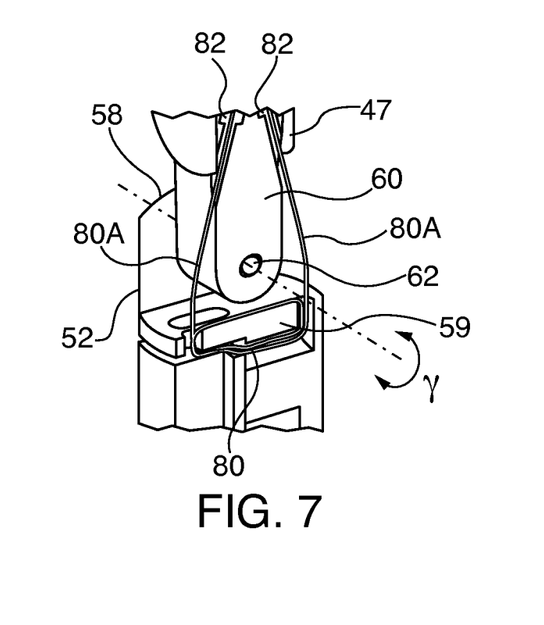
Figures 8, 9:
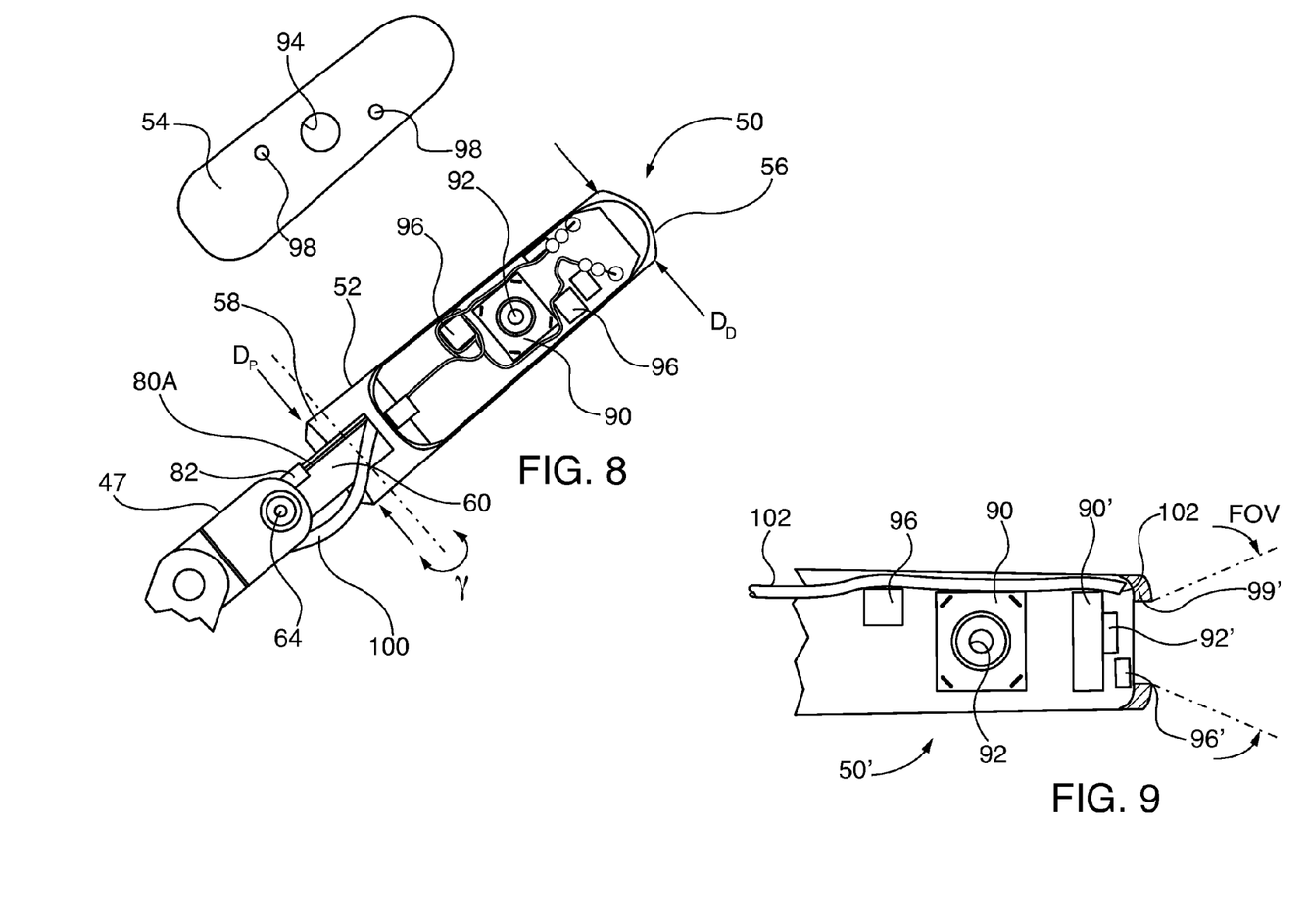
FIG. 8 is a perspective schematic view of the camera head camera and illumination source of the optical camera inspection system of FIG. 2, in accordance with an embodiment of the invention.
FIG. 9 is a planar schematic view of a camera head showing a pair of orthogonally aligned cameras and illumination sources of the optical camera inspection system in accordance with an alternative embodiment of the invention.

Referring also to FIGS. 6-8, the camera head 50 has a camera head body 52, which preferably has a tapered decreasing diameter from its proximal end $D_P$ to its distal end $D_D$. A selectively removable camera head cover 54 provides access to the camera head body 52 interior. The camera head distal tip 56, is preferably configured in a rounded or bullet-like shape, which combined with the tapered camera body 52 facilitates pushing advancement through passages within the inspected power generation machinery. The camera head pivot axis 58 is coupled to connector block 60 distal pivot 62 to provide the camera head 50 swing range of motion γ. The connector block 60 also defines a proximal pivot axis 64 that is pivotally coupled to the cable carrier distal end 47; together they define the tilt α range of motion. The camera head body 52 also defines an anchoring post 59 for coupling the camera head 50 to the camera head swing motion drive system.

The camera head swing motion drive system selectively positions the camera head 50 along the camera head swing range of motion path γ, and includes opposed biasing elements respectively coupled to the camera head anchoring post 59 laterally in opposed offset positions relative to the coupled camera head pivot axis 58/connector block pivot axis 62, so that biasing the first biasing element swings the camera head in a first direction (arrow I, FIGS. 2,4,6) and biasing the second biasing element swings the camera head in a second direction (arrow II in the same figures) about the swing range of motion γ.

Figure 5:
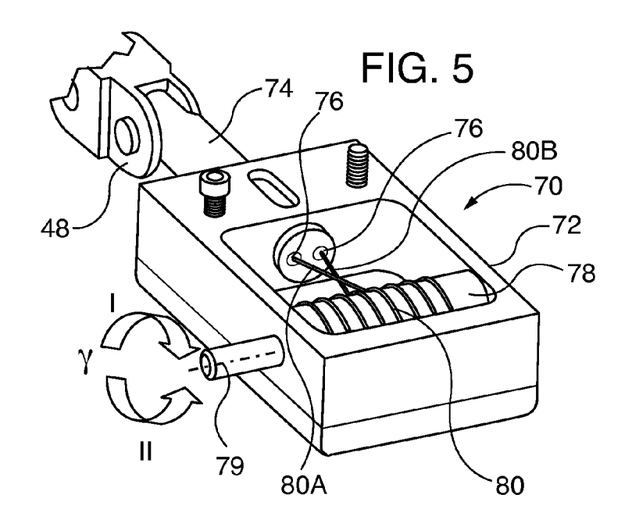
FIG. 5 is perspective view of cable winder portion of a drive system for selectively positioning the camera head along the camera head range of motion path, in accordance with an embodiment of the invention.

The swing motion drive system biases the biasing elements with a cable winder 70, shown in FIGS. 2, 4 and 5. The cable winder 70 has a winder body 72, winder cover 73 and guide shaft 74 that couples the cable winder to the proximal end 48 of the cable carrier 42. The guide shaft 74 defines a pair of cable guide channels 76 that are in communication with the previously described hollow interior of cable carrier 42. Winding drum 78 is rotatively coupled to the winder body 72 and selectively rotated by external handle 79. The handle 79 may be constructed in any known configuration as an alternative to the spindle configuration shown in FIG. 5.

A continuous tensioning cable 80 is wrapped around the winding drum 78. Ends of the cable 80 are passed through the cable guide channels 76 and cable sheaths 82 that are retained within the cable carrier 42, terminating at the distal end 47 thereof in proximity to the connector block 60. Thereupon the continuous cable 80 is wrapped around the camera head projecting post 59. The continuous cable 80 defines a first end portion 80A that functions as the first biasing element for swinging the camera head in the I arrow range of motion by rotating the winding drum spindle handle 79 in the corresponding I rotational arrow direction of FIG. 5. Concurrently the continuous cable 80 defines a second end portion 80B that functions as the second biasing element for swinging the camera head in the II arrow range of motion by rotating the winding drum spindle handle 79 in the corresponding II rotational arrow direction of FIG. 5. Selectively turning the spindle handle 79 in either rotational direction I or II bias tensions the corresponding cable end portion 80A or 80B and pulls the camera head 50 in the desired swing motion direction I or II, as shown in FIG. 6.

Referring to FIG. 8, the camera head 50 retains optical camera 90 that captures images in the visible light or infra-red spectrum through lens 92 within a field of view (FOV) established within the boundaries of the camera cover 54 camera port 94. The camera 90 is a known auto-focusing USB camera of the type routinely used with personal computers. Cameras having different resolution and focus properties may be substituted for the auto-focusing USB camera 90. Light emitting diodes (LEDs) 96 provide illumination for the camera 90, through illumination ports 98 within the camera head cover 54, during internal inspection of power generation machinery. The camera head 50 illumination system may employ LEDs or other illumination sources of desired output intensity or other characteristics, including by way of non-limiting example steady-state or strobe illumination, variable or dimmable intensity outputs. Cable 100 provides power to the camera 90 and illumination system LEDs 96, transmits camera control signals or other commands to the camera 90 and routes camera image signals or other information data from the camera. In the alternative, the camera 90 and LED or other illumination devices 96 may be powered by a stored energy device retained within the camera head 50, such as a battery or capacitor. Alternatively camera 90 operational commands and captured image or other data may be transmitted wirelessly to or from the camera head 50.

FIG. 9 shows an alternative embodiment camera head 50' having a pair of cameras 90, 90' with respective fields of view oriented parallel to and perpendicular to the camera head central axis. The camera 90' orients its lens 92' field of view (FOV) through an aperture 99 defined in the camera head 50' distal tip, as does the illumination LED 96'. In this embodiment the illumination system, shown comprising a pair of light emitting diodes 96, 96' are respectively mounted transverse with and co-axial with the camera head 50' central axis. The LEDs 96, 96' provide illumination for the cameras 90, 90' during internal visual inspection of power generation machinery. The LED lights 96, 96' may be oriented in any desired position relative to the camera head 50' central axis. The camera head 50/50' embodiments illumination systems may employ LEDs or other illumination sources of desired output intensity or other characteristics, including by way of non-limiting example steady-state or strobe illumination, variable or dimmable intensity outputs.

Figure 10:
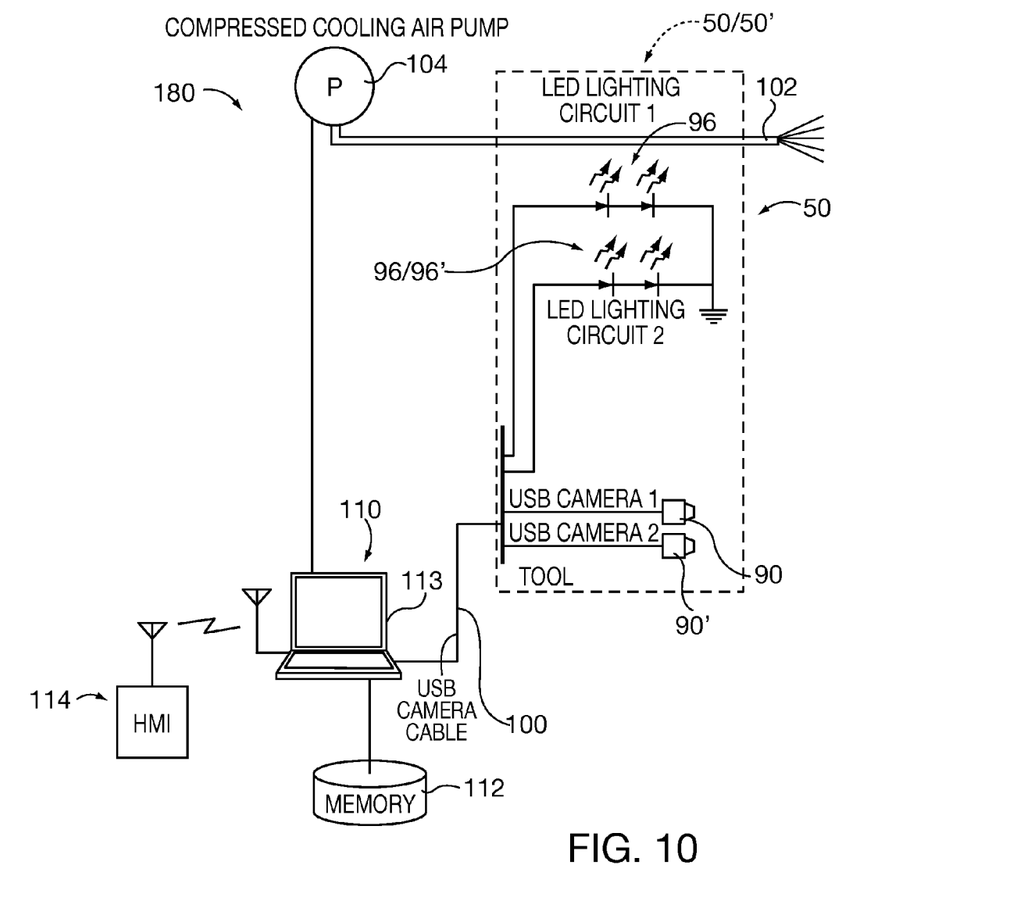
FIG. 10 is a block diagram of the control system for the optical camera inspection system of FIG. 2 in accordance with an embodiment of the invention.

If desired, the inspection scope 40, utilizing either of the camera head embodiments 50 or 50', is externally cooled by a cooling air line 102 and pressurized cooling air source 104 (e.g., compressed air), schematically shown in the embodiments of FIGS. 9 and 10. Cooling air passes through the inspection scope 40 to transfer heat away from the instrument, where it exhausts through gaps within the camera head 50/50' outer surface, such as the camera ports 94, 99 the LED ports 98 and the camera tip port 99'. Those gaps effectively function as cooling air exhaust ports. Cooling air exhausting the various cooling ports helps transfer heat out of the scope camera head 50/50' and helps create a thermal barrier around the camera head that is relatively cooler than the not fully cooled turbine 30 internal temperature. In this manner the inspection scope 40 can be inserted into warm, shut-down turbine before it cools to ambient air temperature. In this manner inspection can be initiated earlier than was permissible with known non-cooled inspection systems. Thus an inspection procedure can be initiated and completed earlier in a turbine service period than was possible in the past, possibly reducing the aggregate maintenance cycle time.

Camera Control and Operation

Inspection scope 40 camera FOV positioning within a power generation machine's internal area of interest is accomplished by advancing and/or retracting the cable carrier 42 within internal passages defined within the machinery. The restricted cable carrier 42 flexure motion to planar bi-directional pivoting relative to the chain link 42 pivot axes provides a suitable balance between stiffness and tight turning radius needed for advancing the inspection scope within the gas turbine 20 narrow passages. The camera head 50/50' swing orientation angle γ is selectively manipulated with the camera head tilt drive system winder 70 by twisting the winding handle 79.

FIG. 10 is block diagram of an exemplary motion control system of the present invention that is utilized with the camera head 50 or 50' of FIG. 8 or 9. The previously described inspection scope 40 camera head 50/50' is designated by dashed line 50, and is in communication with controller 110 by way of known communication pathways, such as multi-pathway cable 100. All of the components shown in FIG. 10 are of known design. The controller 110 or a separate, standalone digital light controller controls the illumination source LEDs 96/96' luminal output and on/off (including strobe function, where applicable). The controller 110 is coupled to the cooling pump 104 and also controls cooling air flow into and through the inspection scope 40, for example flow rate out the cooling tube 102.

An exemplary controller 110 is a personal computer with internal memory capacity and if desired external memory 112. The controller computer 110 also receives and processes image data from camera 90 (USB Camera 1) and camera 90' (USB Camera 2). The controller computer 110 may archive or otherwise store raw or processed image data in memory 112. Inspection scope 40 can be controlled under human command and control, such as via HMI viewing/touch screen 113. Visual images from the cameras 90/90' can be viewed by HMI viewing screen 113 or communicated to other image viewing or data processing systems via known communication pathways.

Optionally the controller computer 110 may have wireless communication capability, for example to communicate with other computers, including for example a tablet computer 114 with HMI. The tablet computer may be utilized by an inspection operator to view camera images in real time during inspection scope 40 placement within power generation machinery.

Although various embodiments, which incorporate the teachings of the present invention, have been shown and described in detail herein, those skilled in the art can readily devise many other varied embodiments that still incorporate these teachings. For example, "optical images" of power generation machinery internal components can be obtained in the visible light spectrum or in the infrared spectrum. The inspection scope 40 ranges of motion do not have to be limited to those exemplary motions shown and described with respect to the embodiments herein. Camera head 50/50' or other scope 40 motion does not have to be imparted by a winding device 70, and can include known alternative mechanical motion control devices or systems.

What is claimed is:

1. A system for internal inspection of power generation machinery, comprising:
    an elongated cable carrier, capable of being maneuvered into internal areas of interest within power generation machinery from access points outside the machinery, the cable carrier formed from a series of chain links that are pivotally coupled to each other end-to-end along a series of parallel pivot axes, which parallel axes constrain carrier cable flexure along a commonly defined carrier cable flexure motion plane, each respective link defining a pair of the of the series of commonly aligned pivot axes along a link centerline at opposite ends thereof, with adjoining coupled chain links restricted to bi-directional pivotal motion relative to each link's respective link centerline along the carrier cable flexure motion plane;
    a camera head coupled to a distal end of the cable carrier; and
    a camera, having a field of view, which is capable of remote image capture, coupled to the camera head.

2. The system of claim 1, further comprising a connector block coupled between the cable carrier distal end and the camera head, the connector block having a pivot axis coupled to the camera head for swinging the camera head along a camera head range of motion path that intersects the cable carrier flexure motion plane.

3. The system of claim 2, further comprising a camera head swing motion drive system coupled to the camera head, for selectively positioning the camera head along the camera head range of motion path, the drive system having opposed first and second biasing elements respectively coupled to the camera head laterally in opposed offset positions relative to the connector block pivot axis, so that biasing the first biasing element swings the camera head in a first direction and biasing the second biasing element swings the camera head in a second direction.

4. The system of claim 3, further comprising:
    the camera head swing motion drive system first and second biasing elements including first and second tensioning cables confined within the cable carrier, coupled to each respective side of the camera head; and
    at least one cable winder coupled to a proximal end of the carrier cable, with at least one of the first or second tensioning cables wrapped about the cable winder.

5. The system of claim 4, the first and second tensioning cables comprising opposite first and second ends of a common continuous tensioning cable that is wrapped about a rotating cable winder drum, so that winding the cable winder drum in a first rotational direction tensions the first tensioning cable end and winding the cable winder drum in a second rotational direction tensions the second tensioning cable end.

6. The system of claim 1, comprising a pair of cameras with respective fields of view oriented parallel to and perpendicular to a camera head central axis defined by the camera head.

7. The system of claim 1, the camera head further comprising an illumination source.

8. The system of claim 7, the illumination source comprising a light emitting diode.

9. The system of claim 1, further comprising a camera head cooling system coupled to the camera head.

10. The system of claim 1, further comprising the camera head having a tapered profile narrowing from an end proximal the energy cable to a distal end; an interior recess retaining the camera and a camera cover positioned over the interior recess.

11. A system for internal inspection of power generation machinery, comprising:
    an elongated cable carrier, capable of being maneuvered into internal areas of interest within power generation machinery from access points outside the machinery, the cable carrier formed from a series of chain links that are pivotally coupled to each other end-to-end along a series of parallel pivot axes, which parallel axes constrain carrier cable flexure along a commonly defined carrier cable flexure motion plane, each respective link defining a pair of the of the series of commonly aligned pivot axes along a link centerline at opposite ends thereof, with adjoining coupled chain links restricted to bi-directional pivotal motion relative to each link's respective link centerline along the carrier cable flexure motion plane;
    a camera head;
    a connector block coupled between the cable carrier distal end and the camera head, the connector block having a pivot axis coupled to a pivoting joint in the camera head, for swinging the camera head along a camera head range of motion path that intersects the cable carrier flexure motion plane;
    a camera, having a field of view, which is capable of remote image capture by a control system, coupled to the camera head; and
    a control system coupled to the camera, for capturing a camera image of a power generation machine internal area of interest within the camera field of view.

12. The system of claim 11, further comprising a camera head swing motion drive system coupled to the camera head, for selectively positioning the camera head along the camera head range of motion path, the drive system having opposed first and second biasing elements respectively coupled to the camera head laterally in opposed offset positions relative to the connector block pivot axis, so that biasing the first biasing element swings the camera head in a first direction and biasing the second biasing element swings the camera head in a second direction.

13. The system of claim 12, the camera head swing motion drive system first and second biasing elements comprising first and second ends of a continuous tensioning cable confined within the carrier cable and wrapped about a rotating cable winder drum that is coupled to a proximal end of the carrier cable, so that winding the cable winder drum in a first rotational direction tensions the first tensioning cable end and winding the cable winder drum in a second rotational direction tensions the second tensioning cable end.

14. The system of claim 11, further comprising the camera head having a tapered profile narrowing from an end proximal the energy cable to a distal end; an interior recess retaining the camera; and a camera cover positioned over the interior recess.

15. The system of claim 11, the camera head further comprising an illumination source.

16. A method for internal inspection of power generation machinery, comprising the steps of:
providing an internal inspection system having:
an elongated cable carrier, capable of being maneuvered into internal areas of interest within power generation machinery from access points outside the machinery, the cable carrier formed from a series of chain links that are pivotally coupled to each other end-to-end along a series of parallel pivot axes, which parallel axes constrain carrier cable flexure along a commonly defined carrier cable flexure motion plane, each respective link defining a pair of the of the series of commonly aligned pivot axes along a link centerline at opposite ends thereof, with adjoining coupled chain links restricted to bi-directional pivotal motion relative to each link's respective link centerline along the carrier cable flexure motion plane;
a camera head coupled to a distal end of the cable carrier; and
a camera, having a field of view, which is capable of remote image capture, coupled to the camera head;
inspecting the power machine by positioning the inspection system and camera field of view along a the navigation path within the machine to an internal area of interest therein with the cable carrier and capturing a camera image thereof.

17. Inspecting internal components of an industrial turbine with the method of claim 16.

18. The method of claim 16, further comprising:
providing the internal inspection system with a connector block coupled between the cable carrier distal end and the camera head, the connector block having a pivot axis for swinging the camera head along a range of motion path that intersects the cable carrier bi-directional planar motion path; and
swinging the camera head during the power generation machinery inspecting.

19. Inspecting internal components of an industrial turbine with the method of claim 18.

20. The method of claim 19, further comprising:
providing a control system coupled to the camera, for controlling camera image capture;
providing a light emitting diode illumination system in the camera head;
illuminating an industrial turbine internal area of interest with the illumination system;
capturing and storing an image within the camera field of view under control of the control system.

* * * * *